Figure 1:
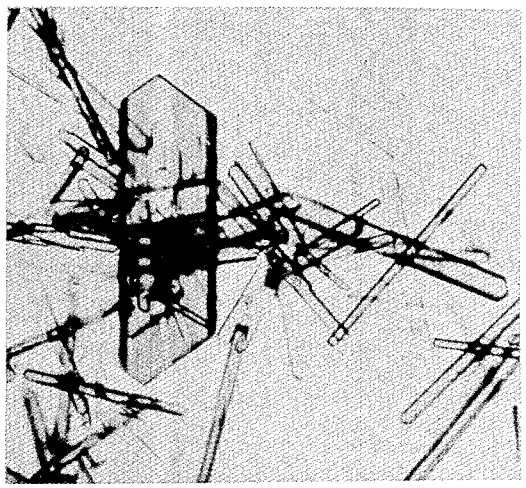

May 16, 1961

G. NOMINE ET AL 2,984,661

METHOD OF PREPARING PURE VITAMIN $B_{12}$ AND INTERMEDIARY OBTAINED THEREBY

Filed Aug. 8, 1956

INVENTORS
Gerard Nomine, Lucien Penasse
BY Pierre Barthelemy
Klein & Hart
their attorneys.

United States Patent Office 2,984,661
Patented May 16, 1961

2,984,661
METHOD OF PREPARING PURE VITAMIN $B_{12}$ AND INTERMEDIARY OBTAINED THEREBY

Gerard Nomine, Noisy-le-Sec, Lucien Penasse, Paris, and Pierre Barthelemy, St.-Germain-en-Laye, France, assignors to UCLAF, Paris, France, a body corporate of France Filed Aug. 8, 1956, Ser. No. 602,874

Claims priority, application France July 5, 1956

7 Claims. (Cl. 260—211.5)

This invention relates to new, crystalline vitamin $B_{12}$-phenol complexes and to the method of preparing them and obtaining pure vitamin $B_{12}$ therefrom.

It is, therefore, one object of the present invention to provide a method of preparing crystalline vitamin $B_{12}$-phenol complexes from vitamin $B_{12}$ concentrates which may be of a purity of less than 95%, obtained by means of customary extraction and purification processes for vitamin $B_{12}$ from various sources, such as culture media of microorganisms, sewage disposal plant residues, or liver extracts, which contain in the average 0.5°/₀₀ of the vitamin.

It is another object of the invention to isolate and to provide these crystalline vitamin $B_{12}$-phenol complexes as pure compounds.

It is still another object of the invention to employ these crystalline vitamin $B_{12}$-phenol complexes in the preparation of pure vitamin $B_{12}$.

These and other objects and advantages of the present invention will appear more clearly from the herein-following detailed description and from the appended claims. It is to be stressed, at this point, that, because of the relative simplicity and high efficiency, the method is eminently suited for commercial production.

It has been previously known that the addition of an excess of phenol, which must be lower, however, than the maximum amount of phenol soluble in water (8.2 parts in 100 parts of water at 15° C.), to an aqueous vitamin $B_{12}$ solution causes the formation of an oily vitamin $B_{12}$-phenol complex. This oily complex is soluble in water containing a great excess of phenol in relation to the vitamin $B_{12}$ present and does not precipitate until the phenol concentration in the aqueous solution is adjusted to 3–5%. The oil, precipitating thereupon, is readily soluble in chlorinated solvents in the presence of phenol. However, because of its physical properties, the oil cannot be used as a sufficiently effective means of purifying vitamin $B_{12}$; the oil forms ternary solutes with the impurities contained in the aqueous vitamin $B_{12}$ solution and retains a large part thereof.

We have now found that hydrated, crystalline vitamin $B_{12}$-phenol complexes are obtained by adding to an aqueous vitamin $B_{12}$ solution that may be less than 95% pure but should have a concentration of at least 0.5°/₀₀, an amount of phenol which does not exceed 3% but is preferably adjusted to 2% of the volume of the aqueous solution.

These new complexes are clearly defined crystalline compounds, as may be seen from the microphotography Fig. 1 of the accompanying drawing, and have the following general formula:

$$C_{63}H_{90}N_{14}O_{14}PCo \cdot (C_6H_6O)_n \cdot (H_2O)_x$$

wherein $n$ represents the numerals 2 and 4 and $x$ is a denominator ranging from 4 to 11, depending upon the conditions at which the particular compound has been prepared and dried.

Aside from their physical properties, these derivatives are characterized by their insolubility in water containing about 2% of phenol, and their insolubility in dichloroethane and in dichloroethane containing as much as 10% of phenol.

The new compounds are readily dissociated in water, wherein they can be easily dissolved by reducing the phenol content to less than 1%. It suffices to add to this solution a solvent miscible with water in which vitamin $B_{12}$ is insoluble, in order to obtain crystalline cyanocobalamine of high purity. As known, an aqueous solution of impure vitamin $B_{12}$ consists of a mixture of cyanocobalamine, dicyanocobalamine and hydroxocobalamine which precipitate together if the pH is not adjusted with extreme care. We found that dicyanocobalamine does not form hydrated, crystalline complexes with phenol and, therefore, remains in solution when cyanocobalamine is precipitated in form of a hydrated, crystalline complex with phenol.

In order to form the hydrated, crystalline vitamin $B_{12}$-phenol complexes according to this invention, about 2% by volume of phenol are added to a vitamin $B_{12}$ concentrate of a concentration of at least 0.5°/₀₀. The yield is quantitative. The process may be used in connection with concentrates that are high in vitamin $B_{12}$ as well as in connection with solutions of the pure vitamin. However, when operating with solutions the vitamin $B_{12}$ concentration of which is less than 0.5°/₀₀, crystallization becomes difficult.

The following examples are presented to illustrate, but in no way to limit, the scope of the present invention.

EXAMPLE 1

*Formation of the hydrated phenol complex starting from a solution of pure vitamin $B_{12}$ and recovery of vitamin $B_{12}$*

0.2 cc. of liquid phenol is added to a solution of 100 mg. of pure, crystalline vitamin $B_{12}$ in 10 cc. of water. If necessary, crystallization is initiated in the solution by scraping the wall of the vessel with a glass stirrer and is completed upon standing at room temperature, say, overnight.

Figure 2:
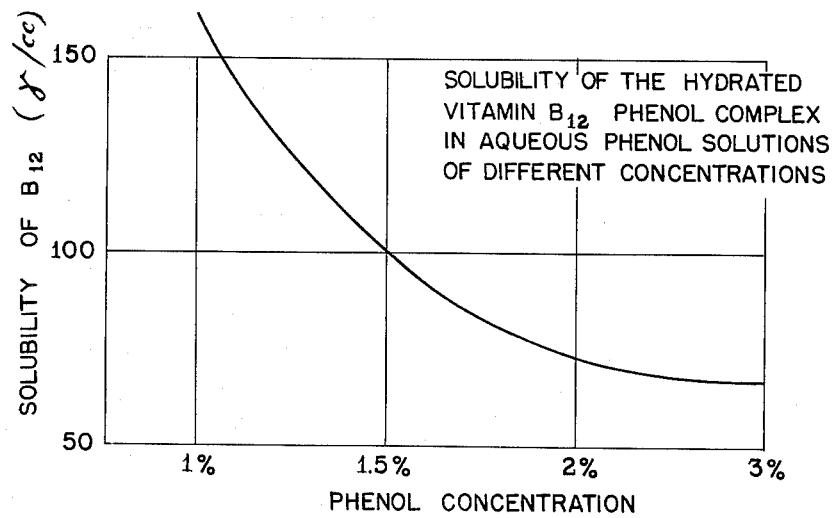

The crystals of the hydrated vitamin $B_{12}$-phenol complex are separated, washed with acetone wherein they are insoluble and dried under vacuum at room temperature. Yield: 105 to 110 mg. of bright red hexagonal crystals. The compound is soluble in methanol, 80% phenol, insoluble in acetone, dioxane, dichloroethane and dichloroethane having 10% phenol. The solubility rates of the compound in dilute, aqueous phenol solutions are set forth in the diagram Fig. 2 of the accompanying drawing. When treated with an aqueous potassium cyanide solution, the compound redissolves, even in the presence of excess phenol, after formation of dicyanocobalamine. On the other hand, previously prepared dicyanocobalamine produces no complexes of this type.

Upon dissolving 100 mg. of the afore-described complex in 10 cc. of water, precipitating with 100 cc. of dioxane, and separating and drying, about 90 mg. of purest vitamin $B_{12}$ are obtained.

*Analysis of the hydrated phenol complex.*—1 cyanocobalamine,

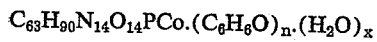
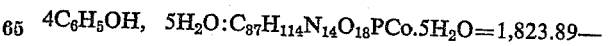

calculated: 57.28% C; 6.85 H; 10.75% N. Found: 57.1% C; 6.7% H; 10.7% N.

*Determination of vitamin $B_{12}$ by spectrophotometry.*—Calculated: 74.4% $B_{12}$. Found: 74.6% $B_{12}$.

*Determination of phenol by colorimetry.*—Calculated: 20.6% $C_6H_5OH$. Found: 18.7% $C_6H_5OH$.

EXAMPLE 2

*Preparation of the hydrated phenol complex of vitamin $B_{12}$, starting from a vitamin $B_{12}$ of less than 95% purity and recovery of pure vitamin $B_{12}$*

100 mg. of vitamin $B_{12}$ of 72% purity, $H_2O$ 9.6%, are dissolved in 9.8 cc. of water and 0.2 cc. of liquid phenol are added. Crystallization is initiated with a few crystals of the hydrated complex obtained according to example 1. After a crystallization period of 24 hours at room temperature, the crystals are separated. The hydrated crystals are dissolved in 10 cc. of water, and 100 cc. of dioxane are added in order to recover pure, crystalline cyanocobalamine. 73 mg. of vitamin $B_{12}$ of 99% purity, 12% $H_2O$, are obtained, representing a yield of 97%.

Obviously, the invention is not limited to the foregoing examples. Thus, the source and concentration of the vitamin $B_{12}$ solution treated in the herein claimed manner may differ, or the phenol concentration may be varied within the claimed range. Likewise, the amount of water used in redissolving the hydrated phenol complex or the nature of the solvent used for precipitating vitamin $B_{12}$ may be different without exceeding the scope of the invention.

We claim:

1. The method of recovering pure vitamin $B_{12}$ from an aqueous solution comprising at least 0.5°/$_{00}$ of vitamin $B_{12}$, which comprises the steps of adding to a quantity of said solution about 2 to 3% by volume of phenol, precipitating the hydrated, crystalline vitamin $B_{12}$-phenol complex, separating said complex, redissolving said complex in water, adding a water-miscible non-solvent for vitamin $B_{12}$ and separating the resulting precipitate.

2. The method according to claim 1, wherein about 2% by volume of phenol are added to a quantity of said vitamin $B_{12}$ solution.

3. The method according to claim 1, wherein said complex, prior to redissolving in water, is washed with acetone.

4. The method according to claim 1, wherein said water-miscible non-solvent for vitamin $B_{12}$ is acetone.

5. The method according to claim 1, wherein said water-miscible non-solvent for vitamin $B_{12}$ is dioxane.

6. The method of preparing a hydrated, crystalline vitamin $B_{12}$-phenol complex, which comprises adding about 2 to 3% by volume of phenol to an aqueous solution comprising at least 0.5°/$_{00}$ of vitamin $B_{12}$, precipitating the said hydrated, crystalline vitamin $B_{12}$-phenol complex, and separating the crystalline precipitate.

7. Hydrated, crystalline vitamin $B_{12}$-phenol complexes of the general formula $$C_{63}H_{90}N_{14}O_{14}PCo \cdot (C_6H_6O)_n \cdot (H_2O)_x$$

wherein $n$ represents the numerals 2 and 4 and $x$ is a denominator ranging from 4 to 11.

References Cited in the file of this patent

UNITED STATES PATENTS 2,823,165   Bernhaner 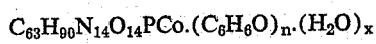 Feb. 11, 1958

OTHER REFERENCES

Bernhauer Angewandte Chemie, vol. 66, No. 24, Dec. 21, 1954, pages 776–780.